United States Patent [19]

Capilupi, Jr.

[11] Patent Number: 5,124,848
[45] Date of Patent: Jun. 23, 1992

[54] MOTORCYCLE DRIVER'S HELMET

[76] Inventor: Mario J. Capilupi, Jr., 8103 Crestview Dr., Niagara Falls, N.Y. 14304

[21] Appl. No.: 650,781

[22] Filed: Feb. 5, 1991

[51] Int. Cl.⁵ .................... G02B 7/18; A42B 1/24
[52] U.S. Cl. .................... 359/861; 359/862; 359/879; 2/410; 2/422
[58] Field of Search ........... 350/618, 622, 623, 623, 350/631, 632, 638, 540, 543, 544; 2/422, 410; 359/861, 862, 865, 879, 880

[56] References Cited

U.S. PATENT DOCUMENTS 3,978,526 9/1976 Mitchell et al. ................ 350/638
4,385,811 5/1983 Nava ............................ 350/638

FOREIGN PATENT DOCUMENTS 2838547 3/1979 Fed. Rep. of Germany ...... 350/622
1062289 4/1954 France ........................... 2/422
64561 11/1955 France ........................... 350/622
2057159 3/1981 United Kingdom ............. 350/622

Primary Examiner—Bruce Y. Arnold
Assistant Examiner—R. D. Shafer
Attorney, Agent, or Firm—Wallace F. Neyerlin

[57] ABSTRACT

A motorcycle driver's helmet is described. A special optical system or periscope type design is built onto the rear of the helmet for use by a passenger, i.e. not by the wearer. The structure enables the passenger to see in front of the running motorcycle, such as traffic and/or the scenery ahead without having to move to the side to look around the driver.

8 Claims, 2 Drawing Sheets

MOTORCYCLE DRIVER'S HELMET

BACKGROUND OF THE INVENTION

1. Field of the Invention

This invention relates to the structure of a motorcycle driver's helmet wherein a special optical system or periscope type design is built onto the rear of the helmet for use by a passenger, i.e. not by the wearer.

2. Description of the Related Art

A search was conducted in the U.S. Patent Office in Class 2, sub-class 422; and in Class 350, sub-classes 612, 618 and 632. All headgear-mounted visual aids noticed during the search were designed to benefit the wearer, and no one else. The following patent is representative of the prior art.

| U.S. Pat. No. | Issue Date | Title |
| --- | --- | --- |
| 3,978,526 | Sept. 7, 1976 | Periscope Rear View Helmet and Helmet Adapter |

SUMMARY OF THE INVENTION

The helmet of this invention employs a special optical system or periscope structure built onto the rear of the motorcycle driver's helmet and enables the passenger to see in front of the running motorcycle, such as traffic and/or the scenery ahead without having to move to the side to look around the driver. It makes the passenger's view more enjoyable and provides him with the ability to see what the driver sees instead of the back of the drive's helmet. It also overcomes the typical problem of the passenger moving to one side to look around or beyond the driver's helmet, which results in unnecessary or undesirable movement or slanting of the motorcycle from the normally desired vertical position.

DETAILED DESCRIPTION OF THE DRAWINGS AND OF THE PREFERRED EMBODIMENTS

Figure 1:
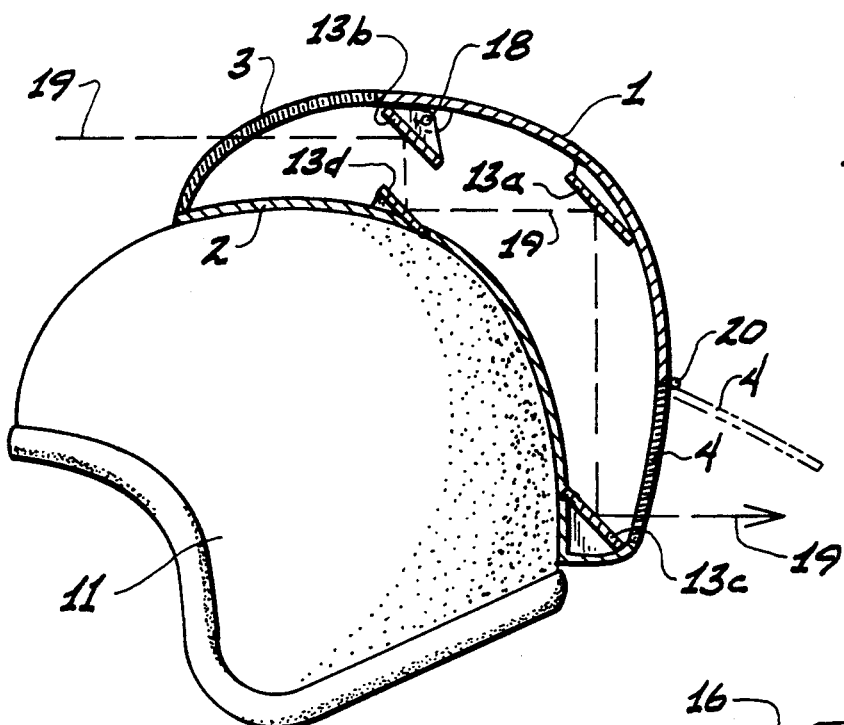
FIG. 1 is a side elevational view, partly in section of the head gear, optical system combination which is believed unique with the present invention.
Figure 2:
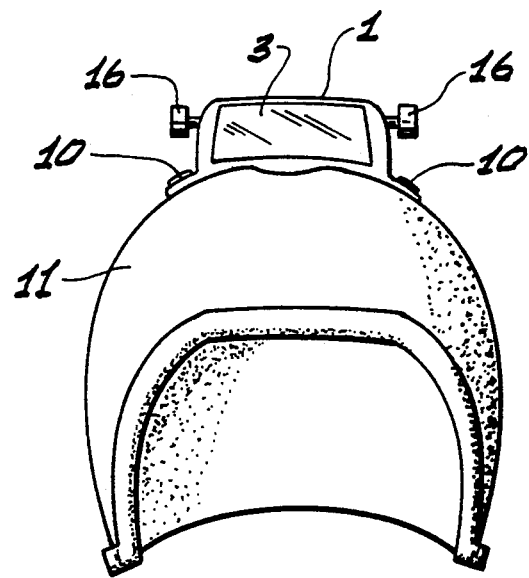
FIG. 2 is a front view of the head gear optical system arrangement shown in FIG. 1, i.e. the view looking toward the face of the motorcycle driver.
Figure 3:
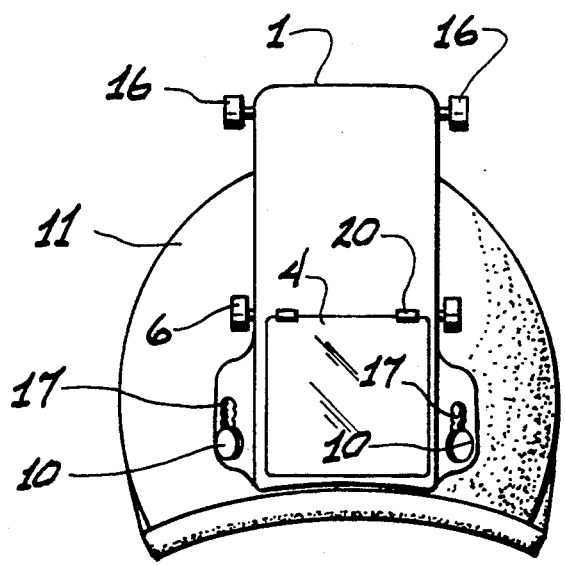
FIG. 3 is a rear view of the headgear optical system arrangement shown in FIG. 1, i.e. the view of the rider looking toward the back of the head of the motorcycle driver.
Figure 4:
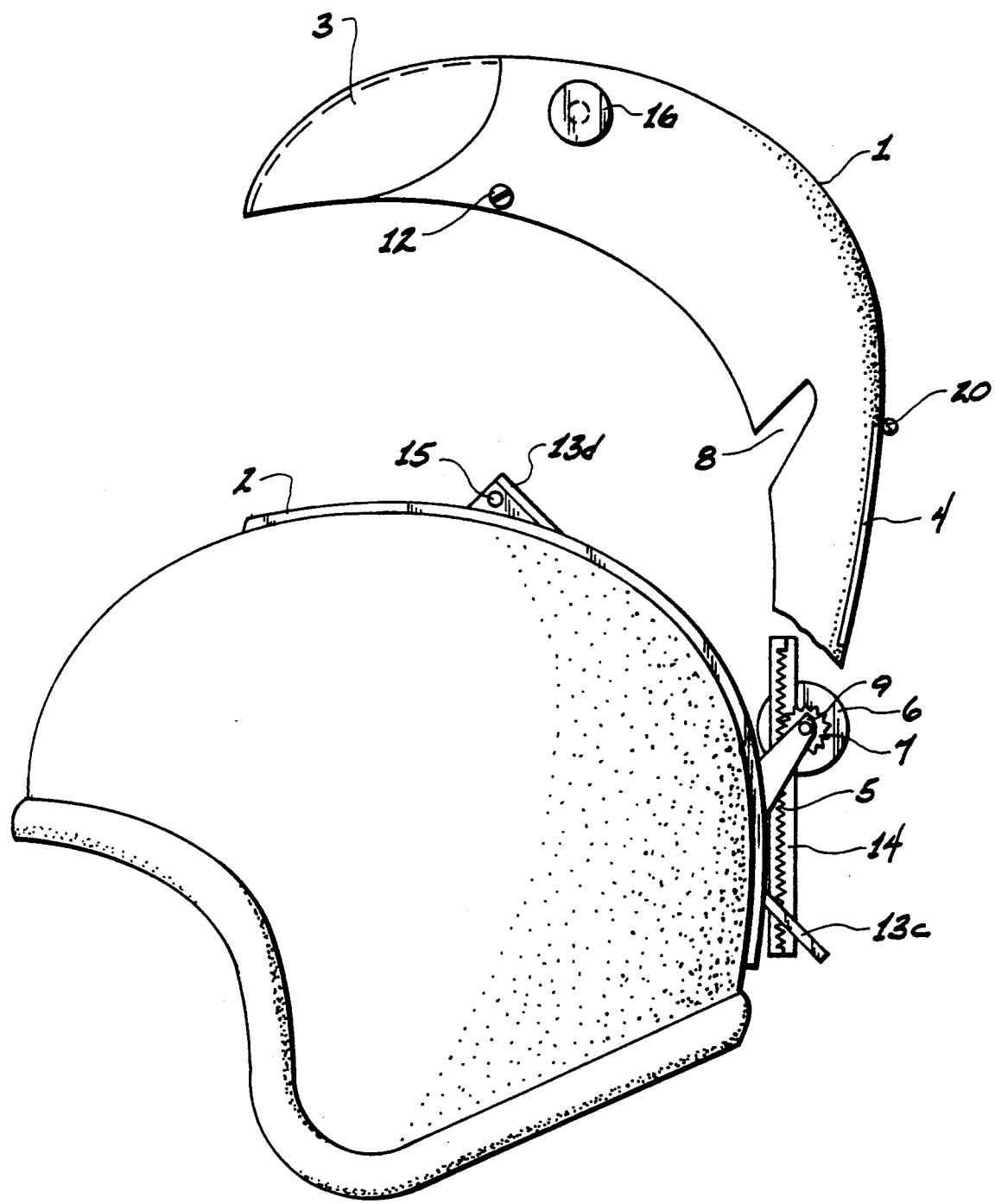
FIG. 4 is a side view of the headgear optical system, with cover removed so as to better illustrate interior features of the helmet and optical system.

The optical system comprises a cover or closure upper section 1 and a base lower section 2. Typically two mirrors 13a and 13b will be suitably mounted in the cover and two mirrors 13c and 13d mounted to the base 2 as shown in FIG. 1. The front of the cover of the optical system will preferably have a transparent visor 3 covering same as a wind shield. The rear of the cover has a clear "window" 4 to look through. As best shown in FIGS. 3 and 4, the height positioning of the mirror 13c can be varied and/or controlled by the passenger by rotating adjustment knob 6 which controls vertical adjustment gear 7 which rides up or down, as desired, on vertical gear 5, which in turn rides up or down on vertical track 14. Movement up or down of the "gear system" is made possible by "pie" or "Vee" shaped cut-out 8 on the side of the cover 1 and "pie" or "Vee" shaped gear support 9, which thus has room for vertical movement up or down in the cut-out 8.

The helmet itself in FIG. 1 is designated by the numeral 11. A suitable number of screws 12 may be used to connect cover 1 to base 2 through screw holes 15 in the base; and snaps 10 can be used to attach the optical system to the back of the helmet 11. Several sets of snaps 10 and notched slots or openings 17 in the helmet for said snaps can provide for variable positioning of the cover on the helmet to accommodate the stature (i.e. the height) of the particular passenger so as to provide his or her easiest viewing through the "periscope".

Adjustment knob 16 on the outside of the helmet cover provides for angular adjustment of mirror 13b. Rivet pin 18, inside the cover, is controlled by knob 16 and acts as a hinge for mirror 13b's angular adjustment.

Window 4 should be sufficiently wide and long enough so as to permit easy looking through same by the passenger without craning or straining his or her neck. The window may also possess hinges 20 (as shown in FIGS. 1 and 3) so as to permit its being opened by the passenger so that he may look directly at mirror 13c if he should so desire. The passenger's resultant, straight-ahead line of sight is designated by numeral 19.

Having thus described the invention, it should be apparent that numerous structural modifications and adaptations may be resorted to without departing from the scope and fair meaning of the instant application as described here and above and as claimed here and below.

I claim:

1. In combination, a head helmet comprising a head protective shell worn by a motorcycle driver and an optical system mounted onto the rear of the driver's helmet to accommodate the view of a passenger riding on the rear of the motorcycle when looking into said optical system, said optical system comprising a plurality of mirrors wherein the arrangement of the optical system provides a straight ahead forward view for the passenger on the motorcycle looking into said optical system and riding behind the driver.

2. The combination according to claim 1 wherein the mirrors are four in number.

3. In combination, a head helmet comprising a head protective shell to be worn by a motorcycle driver and an optical system to be mounted onto the rear of the driver's helmet to accommodate the view of a passenger riding on the rear of the motorcycle when looking into said optical system, said optical system comprising two main structural components, a base attached to the back of the helmet and a cover attached to the base, said base having two mirrors mounted onto said base and said cover having two mirrors mounted in said cover, wherein the arrangement of the optical system provides a straight ahead forward view for the passenger on the motorcycle looking into said optical system and riding behind the driver.

4. The combination according to claim 3 wherein the front of the cover has a transparent visor as a wind shield.

5. The combination according to claim 4 wherein the rear of the cover has a clear window to look through.

6. The combination according to claim 3 wherein attached to the base are adjusting means for vertical movement up or down of one of the mirrors mounted on the base.

7. The combination according to claim 3 wherein attached to cover are adjusting means for angular adjustment of one of the mirrors mounted in said cover.

8. The combination according to claim 3 wherein said combination further comprises adjusting means for variable positioning of the cover on the helmet to accommodate the stature of the passenger so as to provide the passenger with a better view through the optical system.

* * * * *